United States Patent [19]

Savolskis

[11] Patent Number: 4,496,315
[45] Date of Patent: Jan. 29, 1985

[54] PORT WALL AIR JET FOR CONTROLLING COMBUSTION AIR

[75] Inventor: Edward P. Savolskis, Carlisle, Pa.

[73] Assignee: PPG Industries, Inc., Pittsburgh, Pa.

[21] Appl. No.: 510,807

[22] Filed: Jul. 5, 1983

[51] Int. Cl.³ .......................... F24H 7/00; F27D 17/00
[52] U.S. Cl. ...................................... 432/30; 432/180;
432/181
[58] Field of Search ............... 432/149, 150, 179, 180,
432/181, 182, 189, 191, 196, 29, 30; 137/803,
888, 892; 65/336

[56] References Cited

U.S. PATENT DOCUMENTS

| 1,422,858 | 7/1922 | Heilman | 432/189 |
| 1,446,666 | 2/1923 | Schulmeyer et al. | 137/888 |
| 4,375,235 | 3/1983 | Tsai | 165/1 |
| 4,375,236 | 3/1983 | Tsai | 165/1 |

FOREIGN PATENT DOCUMENTS

| 1094396 | 12/1960 | Fed. Rep. of Germany | 432/180 |
| 190165 | 2/1924 | United Kingdom | 432/180 |

OTHER PUBLICATIONS

Pincus, Alexis G., "Combustion Melting in the Glass Industry", The Glass Industry, 1980, pp. 180–184.

Primary Examiner—John J. Camby
Attorney, Agent, or Firm—Dennis G. Millman; Rita M. Irani

[57] ABSTRACT

In a multiport combustion furnace having a plurality of firing ports in undivided communication with a common source of combustion gas or air, the invention provides a method and apparatus for selective control of combustion air flow into one or more of the ports. A small quantity of pressurized gas, e.g. air, is injected, e.g. by way of a flow control pipe in an individual port, generally along the flow path of combustion air through the port to alter the amount of combustion air flowing into the port for mixing with fuel. Combustion air is increased by injecting air cocurrent with the combustion air flow to induce additional flow into the port. Combustion air is decreased by injecting air countercurrent to the flow to impede flow through the port.

11 Claims, 3 Drawing Figures

PORT WALL AIR JET FOR CONTROLLING COMBUSTION AIR

BACKGROUND OF THE INVENTION

This invention relates to furnaces and their operation, and in particular, to furnaces including a plurality of combustion chambers or firing ports which receive heated combustion air from a common distributing chamber or plenum, for combining with fuel to produce a combustion flame. More particularly, the invention relates to controlling the apportionment of combustion air among such chambers or ports in, e.g. a multiport regenerative furnace.

More particularly, the invention relates to controlling the amount of combustion air delivered to any individual firing port from a common combustion air distribution chamber or plenum, e.g. in a multiport regenerative furnace having a nonpartitioned plenum. Such furnaces generally include a plurality of firing ports on each side of the furnace chamber, with ports on one side aligned with, in opposing relation to, ports on the other side. During the firing phase, combustion air passes into a lower plenum, through the regenerator, where it is heated, through the upper plenum to the firing ports where it is combined with fuel for producing a combustion flame for heating material in the furnace chamber. Exhaust gases from each port pass through its opposing port and down through the opposite regenerator for heating the regenerator packing. In other words, while the exhaust phase firing port is receiving exhaust gases, its regenerator is absorbing heat from the exhaust gases and the other firing phase firing port is receiving heated combustion air through its regenerator. The side of the furnace receiving fuel and heated combustion air is periodically reversed so that each side alternately participates in an exhaust phase and a firing phase.

As used herein, combustion air is not limited to any particular combination of gases or proportions thereof, but is used for simplicity to refer to any gas which, when combined with fuel produces a combustible mixture.

The problem of uneven combustion air distribution within the regenerator of a furnace having a gas distributing chamber or plenum atop a regenerator bed is discussed in U.S. Pat. No. 4,375,236 to Tsai, the teachings of which are hereby incorporated by reference. As taught therein, air jets can be utilized to affect a more uniform distribution within regenerator by influencing distribution in the plenum. However, in a multiport furnace, e.g. a glass melting furnace, it is common to have individual ports operating at different firing rates in order to optimize furnace efficiency. More particularly, furnace efficiency depends upon proper distribution of energy input among the firing ports in order to provide an appropriate amount of energy for the portion of the furnace underlying the port. In general, a change in furnace operating conditions such as throughput, melt composition or furnace upset requires a redistribution of energy inputs among the ports to maintain furnace efficiency within an acceptable range. This redistribution is generally accomplished for a given total fuel input by apportioning the fuel among the ports in a nonuniform manner.

The nonuniform fuel distribution requires a correspondingly nonuniform distribution of combustion air among the ports. Too much combustion air relative to the amount of fuel in a particular firing port may be undesirable because the excess heated air is not utilized for combustion. Too little combustion air results in wasted, non-combusted fuel. Although it is possible to increase total combustion air input, e.g. by adjustment of the blower, and thus effect an increase in air to ports where needed this also increases air to ports which may already have the desirable amount of air resulting in less than desired overall efficiency. In other words, for any given total fuel input, there is an optimal amount of total combustion air needed for overall furnace efficiency. At the same time, for any individual port, there is also an optimum amount of combustion air for its fuel input. Consequently, disproportionate fuel input among the ports requires a correspondingly disproportionate combustion air input to affect the desired fuel-air mixture and hence optimize efficiency. It would therefore be desirable to selectively increase or decrease air in only these ports where it is needed while maintaining the proper amount of total combustion air input to the furnace relative to the total fuel input.

In the past, control of the combustion air distribution in individual firing ports has been accomplished primarily by using barriers, e.g. damper tiles made of refractory material, inserted in various locations within the firing port to partially obstruct the flow of combustion air through the port. With this technique, total combustion air can be increased, e.g., by increasing blower output, and then dampers are used in particular ports where no increase in combustion air is desired. The use of refractory barriers or dampers, however, has several drawbacks. The refractory dampers are expensive and begin to deteriorate fairly quickly in the harsh firing port atmosphere creating accumulating debris on the port floor. This debris further obstructs flow of combustion air in an uncontrolled manner and is difficult to remove. Attempts to rake the debris from the port can result in moving the debris into the regenerators causing clogging and a decrease in flow rate through the regenerator. Furthermore, although dampers can be useful to decrease combustion air flow through a port, they are not suitable for increasing combustion air. In addition, dampers have the substantial drawback of providing only imprecise control limited by the size and shape of refractory blocks or tiles which can be conveniently inserted into the firing port at fixed locations to obstruct flow.

It would therefore be advantageous to have a method of selectively controlling combustion air in a firing port which does not have the limitations of presently available techniques.

SUMMARY OF THE INVENTION

The invention relates to a method of controlling flow of cumbustion gas, e.g., air, through a combustion chamber, e.g. a furnace firing port, by employing a gaseous stream, e.g. a jet of air, to entrain or obstruct combustion air flowing through the port. For increasing combustion air flow, one or more air jets, are directed into and cocurrent with the stream of the combustion air flowing through the port to induce more combustion air to flow into the port from a source of combustion air. For decreasing combustion air flow through the port, the air jet is directed countercurrent to the flow of combustion air to restrict or obstruct the flow and thereby reduce the amount of combustion air flowing through the port.

For increasing combustion air, a preferred embodiment includes one or more flow control pipes conveniently mounted through a wall of the firing port with nozzles directed toward the port outlet or mouth along the general flow path of combustion air through the port. A jet of gas, e.g., air is injected by way of the pipe and nozzle cocurrent with the flow through the port during the furnace firing phase. With this arrangement, the air jet functions to induce an increase in the amount of combustion air entering the firing port from its combustion air source, e.g., a plenum chamber atop a regenerator. Controlled increase of combustion air flow through the firing port and consequent control of the combustion mixture for producing the flame may be accomplished by altering the velocity and/or flow rate of air injected by way of air jets to induce a selected amount of additional combustion air flow for a particular firing port.

For decreasing combustion air to a particular port, one or more air jet pipes is inserted through a port wall, e.g. the port crown, sidewalls or floor, with its nozzle opening directed along and generally countercurrent to the general flow path of combustion air. With this arrangement, the air jet functions to obstruct or impede the flow of combustion air into the port. Controlled decrease in combustion air flow may be accomplished by altering the velocity and/or flow rate of air injected by way of the pipes.

The air jets of the present invention provide a relatively inexpensive method and apparatus for precisely controlling combustion air flow in individual firing ports of, for example, a multiport combustion furnace utilizing preheated combustion air from a single source to permit optimization of overall furnace efficiency.

DETAILED DESCRIPTION OF THE PREFERRED EMBODIMENTS

Figure 1:
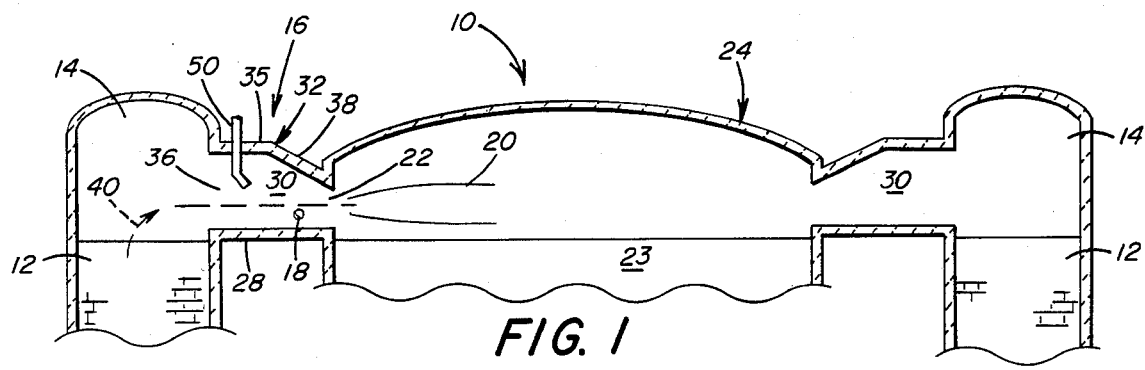
FIG. 1 is a vertical cross-sectional view of a regenerative furnace incorporating features of the invention, showing a single air jet through the port crown for increasing combustion air flow into a firing port.

With reference to FIG. 1, there is shown a regenerative furnace 10 of the type used for melting glass. Although the invention will be described as practiced in a glass melting furnace, as will be appreciated, the invention is not limited thereto, and may be used to control combustion air flow with any combustion furnace including one or more firing ports receiving combustion air from a source of combustion air. The furnace 10 includes regenerators 12 for preheating combustion air, chamber or plenum 14 for passing the combustion air to firing port 16 for mixing with fuel, e.g., from nozzle 18, to produce flame 20 issuing from port mouth 22. The flame 20 furnishes the heat for maintaining molten body of glass and melting batch materials 23 in melting chamber 24. In the following discussion, only the port 16 is described in detail during its firing phase. In a furnace of the reverse firing type, the port 16 would alternately participate in the firing and exhaust phases of the furnace cycle for melting the glass and batch ingredients.

The illustrated firing port 16 includes a floor 28, sidewalls 30 and top wall or crown 32. The crown 32 includes a level section 35 adjoining opening 36 for passing combustion air between the chamber 14 and the port 16 and a sloped section 38 adjoining the port mouth 22.

With continued reference to FIG. 1, there is shown flow control pipe 50 in the flat section 35 of the crown 32 directed toward the flow of combustion air into and through port 16, illustrated as broken line 40.

In general, the flow path of combustion air through a port, e.g., the port 16, is along the line connecting the centers of the opening 36 and the port mouth 22, e.g., the line 40. Although for clarity of discussion, the path is illustrated by the line 40, as can be appreciated, combustion air flows through the port in a broad stream with some turbulence. Only a small amount of flow, however, normally occurs close to the port walls. It is believed that increasing combustion gas flow close to port walls would cause accelerated deterioration of the refractory material of the walls and is therefore undesirable. In the discussion which follows, the air jets are described as directed generally toward the line 40 as the preferred embodiment because, among other reasons, impingement of air from the jets on refractory walls may have deleterious side effects. For example, thermal shock could damage refractories if the air jets are at a lower temperature than the walls. In addition, even if there is no temperature difference between the jet stream and the walls, air jets impinging on walls may cause increased chemical reaction between the refractories and the port atmosphere leading to deterioration of the port walls. Finally, it is believed that the air jets will generally be more effective if they enter the combustion air stream in an area of higher stream velocity than in an area of lower stream velocity, e.g., close to the stream center. However, the described positions for air jets are not limiting to the invention. As will be appreciated, as long as the injected stream of air has a velocity component along the main combustion stream, the injected air will have a controlling effect on the combustion air stream. For example, jets may issue closer to port walls and a larger number of jets may be used to obtain the desired inducing or impeding effect, depending upon the amount of flow control desired.

Figure 2:
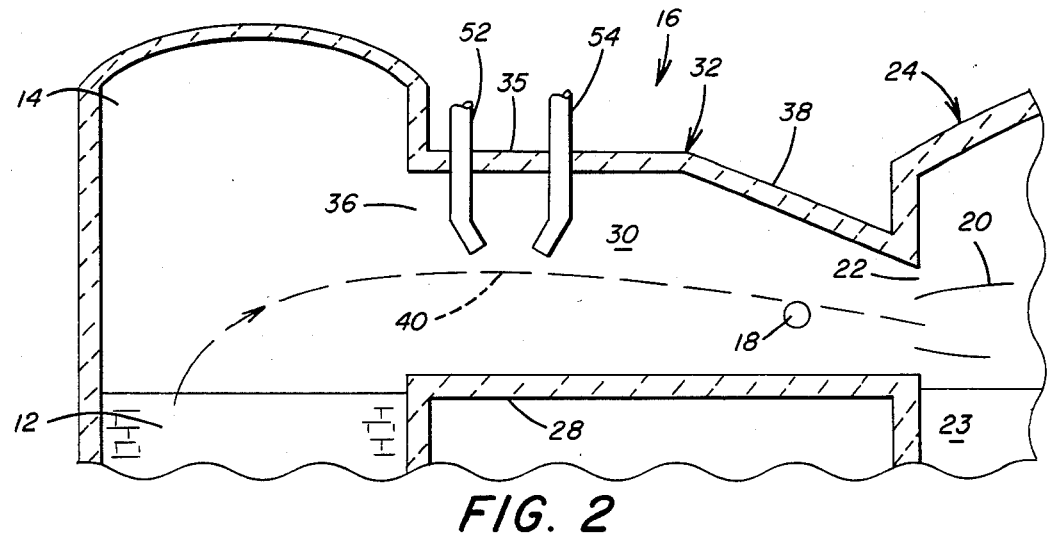
FIG. 2 is a vertical cross-sectional view of a firing port having a pair of opposing air jets in the port crown, one for increasing and one for decreasing combustion air flow in accordance with the teachings of the invention.
Figure 3:
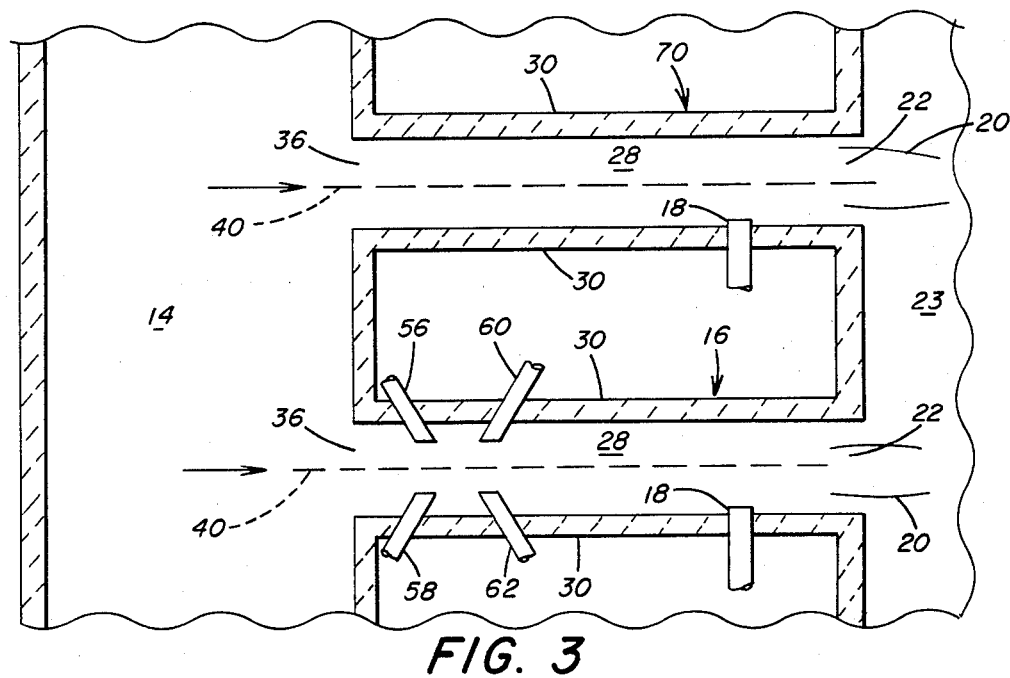
FIG. 3 is a horizontal cross-sectional view of a pair of firing ports illustrating air jets in the sidewalls of one of the ports, one pair for increasing and one pair for decreasing combustion air flow in accordance with the teachings of the invention.

FIGS. 2 and 3 illustrate various positions for flow control pipes within the area of the firing port 16 bounded by the opening 36 and the mouth 22. As can be appreciated, pipes inserted in this area are subjected to a hostile environment and for this reason, are preferably provided with protection from heat, or made of heat resistant materials, e.g., a ceramic material. The pipes may be water cooled, for example, as taught in U.S. Pat. No. 4,375,236 to Tsai at column 5, line 48, through column 6, line 15, the teachings of which patent are hereby incorporated by reference. Alternatively, the pipes may be purged, e.g., with a small amount of compressed air during the exhaust phase of the furnace firing cycle when used in a regenerative furnace of the reverse firing type.

In FIG. 2, a pair of flow control pipes in the port crown 32 is shown, pipe 52 for increasing combustion air flow through the port 16 and pipe 54 for decreasing the flow. It may be desirable to locate the pipe 54 in the sloped crown section 38 as shown because the pipe 54 can direct an air jet toward the line 40 without significantly extending the pipe into the harsh port atmosphere, i.e. due to the slope of the section 38.

FIG. 3 is a plan view of a portion of the furnace 10 showing an additional port 70 to illustrate that combustion air can be selectively controlled in any one or more of the firing ports in a multiport furnace. As will be appreciated, in a multiport furnace, any number of or all ports may include air jets to enable selective apportionment of combustion air from the plenum 14 among the plurality of ports. As shown, four flow control pipes, e.g. pipes 56 and 58 for increasing and 60 and 62 for decreasing combustion air flow are inserted through the sidewalls 30. As illustrated, straight pipe sections can be used if desired by mounting them at an appropriate angle for directing an air jet generally cocurrent with or countercurrent to the line 40.

In operation, flow control is achieved by passing a pressurized gas, e.g. air, into the firing port through one or more selected flow control pipes during the furnace firing phase. For increasing combustion air flow through the port, the pipes 50, 52, 56 and/or 58 may be used. The air injected through the increasing flow control pipes functions to entrain combustion air to induce an increase in combustion air flow through the port.

For decreasing combustion air flow, the pipes 54, 60 and 62 may be used. The air injected through the decreasing flow control pipes functions to impede combustion air flow by restricting or obstructing flow. In other words, the jet acts somewhat like a barrier in impeding or offering resistance to combustion air flow through the port.

In general, flow control pipes may be inserted into the firing port at any convenient location as long as they direct the air jet toward a direction generally cocurrent with the combustion air flow through the port for increasing the flow or generally countercurrent to the flow for decreasing same. For the reasons noted above, it is preferred that air injected by the flow control pipes not directly impinge on firing port refractory walls. However, it is not essential for the practice of the invention that the air jet stream be parallel to the combustion air stream. Depending, among other factors, upon the velocity of the combustion air stream relative to the velocity of the air jet stream, air jets directed obliquely relative to the combustion air stream will have an impeding or inducing effect upon combustion air flow through the port 16 as long as there is a component of velocity of the injected stream in the desired cocurrent or countercurrent direction.

Principle parameters to be considered in the practice of the invention include flow control pipe opening or nozzle diameter, air jet pressure, volume flow rate, and velocity which parameters are interrelated.

In general, a nozzle diameter that is too small can render the air jet ineffective by unduly restricting the volume flow rate of air. On the other hand, if unduly large nozzles are employed, the volume flow rate is increased but the velocity is reduced, thereby reducing the effectiveness of the air jet. Velocity can be increased with a large diameter nozzle by employing greater air pressures, but the resultant increased volume flow rate may be greater than desired, as discussed below.

The amount of air injected by the air jets is not limiting to the invention. An upper limit on the practical volumetric flow rate for an air jet in a furnace using preheated combustion air, e.g. the regenerative furnace 10 shown in FIG. 1, is the cooling effect and consequent loss of thermal efficiency if excessive amounts of unheated air are injected into the preheated combustion air. In general, the volume flow rate of an air jet need be only a minor portion of the total flow through the respective port or other passageway to have a significant effect on the total flow rate, and therefore the overall temperature of the preheated combustion air stream is not substantially reduced. In most cases, the unheated air jet need not constitute more than 10% of the flow rate of preheated combustion air, and preferably no more than 4%. In specific examples set forth more fully below, involving a seven port, reverse fired, regenerative glass melting furnace, air jet flow volumes of about 1.0 to 1.3% of the combustion air passing through the port were found to provide adequate flow control. Even smaller air jet flow rates can yield significant results. The amount of air injected depends primarily upon the amount of flow control needed in the particular combustion chamber or firing port, the total combustion air through the port, and fuel input to the port, all depending on overall furnace design and conditions. Of course, preheating the injected air would avoid the problem of cooling the preheated combustion air permitting larger air jet flow rates, if desired.

In general, high velocity is more effective than large volume, and therefore, at a given pressure, smaller diameter nozzles are preferred. As will be appreciated, nozzle diameter and air jet velocity are largely determined by the inducing or impeding effect needed for control in the particular furnace. In the case of the type of glass furnace described herein, with an air jet operating within the preferred volume discussed above, air jet velocities on the order of about 300 ft/sec, (91.4 m/s) or greater may achieve a measurable increase or decrease of combustion air flow through a firing port having a volumetric flow rate through the port in the range of about 270,000 to 300,000 SCFH (standard cubic feet per hour) without the air jet. Higher velocities will normally produce greater control, e.g. larger increases or decreases, with about 1,000 ft/sec. (304.8 m/s) yielding suitable control for a range of firing rates typical for a multiport glass melting furnace. In addition to the velocity of air injected by the flow control pipe, the volume of air injected also affects the inducing or impeding effect of the air jet, with larger volumes having a greater effect than small volumes. However, unduly large volume flow rates are preferably avoided so as to minimize the cooling effect of the injected air on incoming heated combustion air. More particularly, the volume of air introduced by the air jet should be such that it does not significantly disturb the temperature of the combustion air flowing through the port. For example, if the air jet introduces unheated gas into the firing port, and the combustion air flowing through the port is preheated, e.g. as in the regenerative furnace 10, it is preferable to use a high velocity rather than a high volume air jet for minimizing the effect of the air jet on thermal efficiency of the firing port.

Location of the flow control pipe in the port also is believed to have an effect on the degree of control which may be obtained with a given jet. More particularly, for increasing combustion air flow through the port using a particular velocity and volume of injected air, it is believed that a greater inducing effect will result if the air jet enters the combustion air stream closer to the opening 36 than to the port mouth 22 with the preferred location being adjacent to the opening 36 as illustrated by the pipe 50 shown in FIG. 1. On the other hand, it is believed that for impeding combustion air flow, it is preferable to insert the air jet stream farther away from the opening 36. Although as practiced the pipe 54 was inserted in an existing damper slot located between one fourth and one half the distance from the opening 36 to the port mouth 20 as illustrated in FIG. 2, it is believed that the impeding effect will be greater if the pipe 54 is located as close to the mouth 20 as possible, while still being upstream (e.g., to the left as viewed in FIG. 2) of the fuel nozzle 18.

It is believed that furnaces previously utilizing dampers inserted through the port crown 32 or the port sidewalls 30 can be expeditiously converted to practice the instant invention by inserting one or more flow control pipes in available damper slots. Damper locations are believed suitable for effective flow control pipe locations. Further, in the interest of pipe durability, it is desirable to minimize the length of pipe extending into the port. For this reason, the location for the pipe should be chosen according to the particular configuration of the firing port and the combustion air flow path through the firing port.

As practiced, a flow control pipe 54 was inserted through the level section 35 of the crown 32, about in the center of the section 35 at a point about one fourth of the distance between the opening 36 and the mouth 22 with its nozzle opening aimed back toward the plenum 14 for impeding combustion air flow into the port through the opening 36. With a nozzle opening diameter of about 0.27 inches (0.69 cm), using line pressure of about 80-100 pounds per square inch (14,000 to 17,500 newtons per square meter), an air jet velocity of about 1000 ft/sec. (304.8 m/s) was used to impede the combustion air flow through the port. Analysis of exhaust gases in the opposing exhaust phase firing port revealed a decrease in oxygen levels from 4.5% without the impeding air jet to 3.1% with the impeding air jet indicating a measurable reduction in combustion air through the port.

As can now be appreciated, the large number of variables among furnaces precludes any specific nozzle size, volume, velocity or location recommendations. Reference is made to copending, commonly assigned U.S. patent application Ser. No. 510,808, filed even date, entitled "Target Wall Air Jet For Controlling Combustion Air" of Yih-Wan Tsai, the teachings of which are hereby incorporated by reference, for an example of the relationship of air jet nozzle, and flow settings to the effectiveness in inducing an increase in flow of a gaseous stream. Similar parameters are believed applicable to an air jet inserted in the port to impede air flow to effect a decrease in combustion air input.

In addition, although the above description used air as the injected gas, the invention may be advantageously practiced using any gas. For example, under some circumstances, it may be desirable, e.g. for increasing flame temperature, to add controlled amounts of oxygen to the combustion air. The flow control pipes may conveniently be utilized to simultaneously increase oxygen input and alter the volume of combustion air flow through the port. Further, the use of separate flow control pipes for increasing and decreasing combustion air is not necessary. For example, a single pipe may be provided with dual nozzles and valves or with means for rotating the pipe and/or nozzle to permit a jet to be injected either cocurrent with or countercurrent to the primary flow.

Other variations such as position of flow control air jet pipes as well as dimensions and flow rates can be made without departing from the scope of the invention as defined by the claims which follow.

I claim:

1. A method of operating a regenerative furnace wherein combustion gas is preheated in a regenerator bed and then is passed to a plenum communicating along its length with a plurality of ports through which the combustion gas passes into the furnace, and fuel is combined with the combustion gas at the ports; the improvement comprising apportioning the flow of combustion gas among the plurality of ports by injecting a stream of gas into at least one of the ports so as to affect the portion of the combustion gas flowing therethrough.

2. The method of claim 1 wherein the stream of gas is injected cocurrent with the flow of combustion gas through the port so as to increase the portion of combustion gas flowing through that port.

3. The method of claim 1 wherein the stream of gas is injected countercurrent to the flow of combustion gas through the port so as to decrease the portion of combustion flowing through that port.

4. The method of claim 1 wherein the stream of gas is a jet of compressed air.

5. The method of claim 1 wherein the stream of gas is injected into the port at high velocity relative to the velocity of combustion gas flowing through the port.

6. The method of claim 1 wherein the stream of gas injected into the port is no greater than 10% by volume of the combustion gas flowing through that port.

7. The method of claim 1 wherein the stream of gas injected into the port is no greater than 4% by volume of the combustion gas flowing through that port.

8. The method of claim 1 wherein a stream of gas is injected into a plurality of the ports so as to control the flow of combustion gas through each respective port.

9. The method of claim 1 wherein the stream of gas is directed into the port in an oblique direction to the direction of flow of combustion gas through the port.

10. The method of claim 1 wherein combustion takes place within the furnace above a pool of at least partially melted glass.

11. The method of claim 1 wherein gas flow through the furnace periodically reverses so that said ports receive exhaust gas from the furnace.

* * * * *